No. 712,589. W. B. POTTER. Patented Nov. 4, 1902.
SYSTEM OF MOTOR CONTROL.
(Application filed Nov. 1, 1900.)
(No Model.) 2 Sheets—Sheet 1.
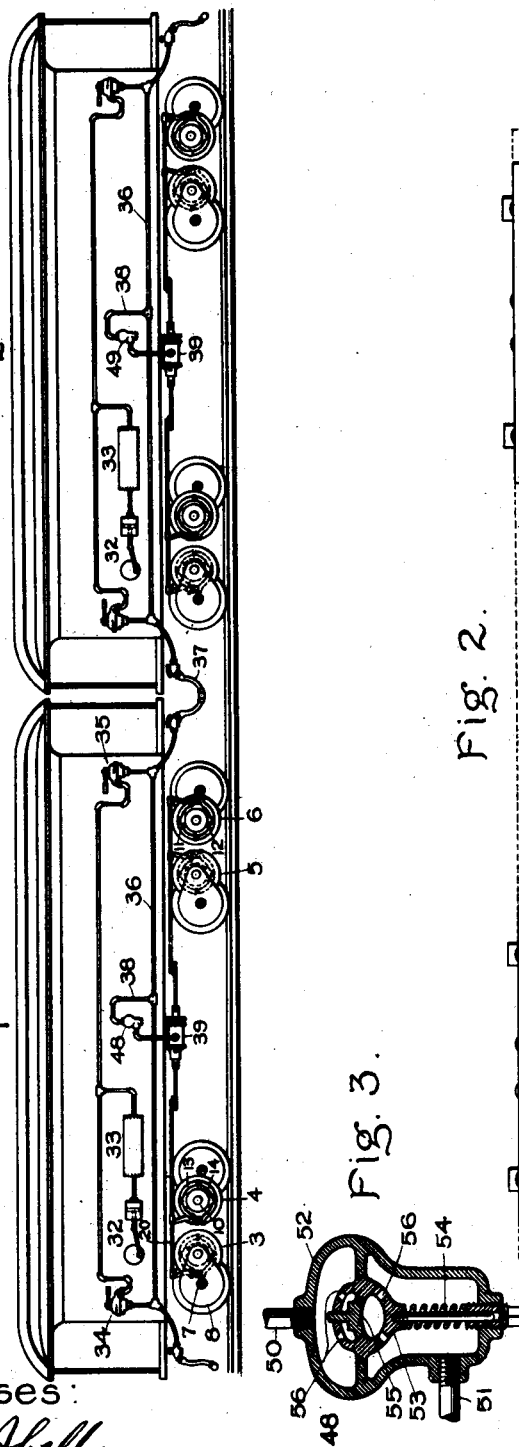
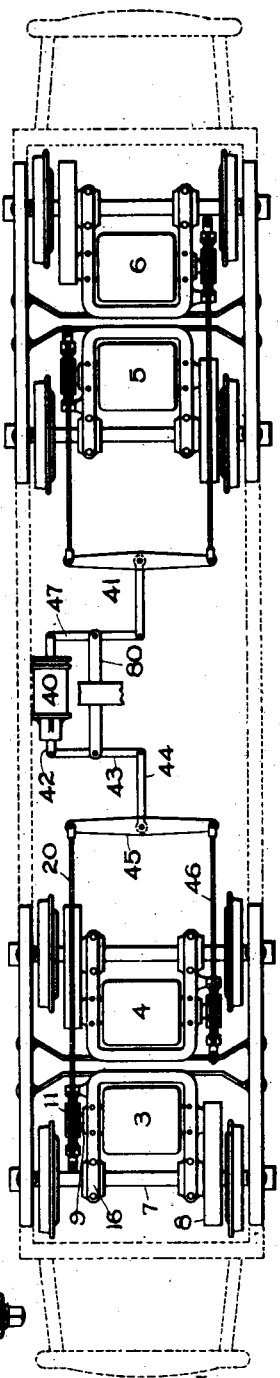
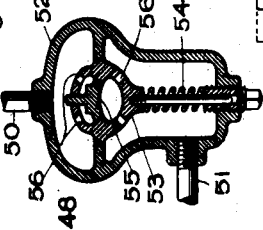
Witnesses:
Lewis Abell.
Benjamin B. Hull.
Inventor:
William B. Potter,
by Albert G. Davis
Atty.

No. 712,589. Patented Nov. 4, 1902.
W. B. POTTER.
SYSTEM OF MOTOR CONTROL.
(Application filed Nov. 1, 1900.)
(No Model.) 2 Sheets—Sheet 2.
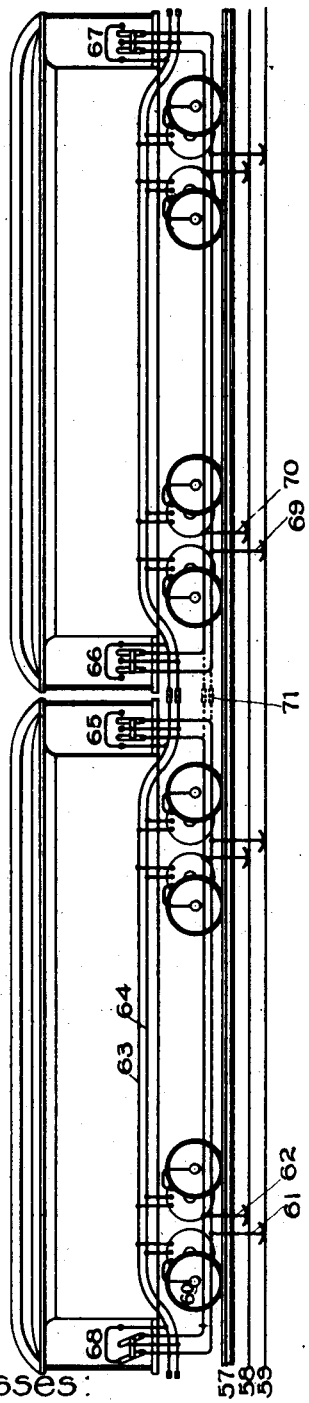
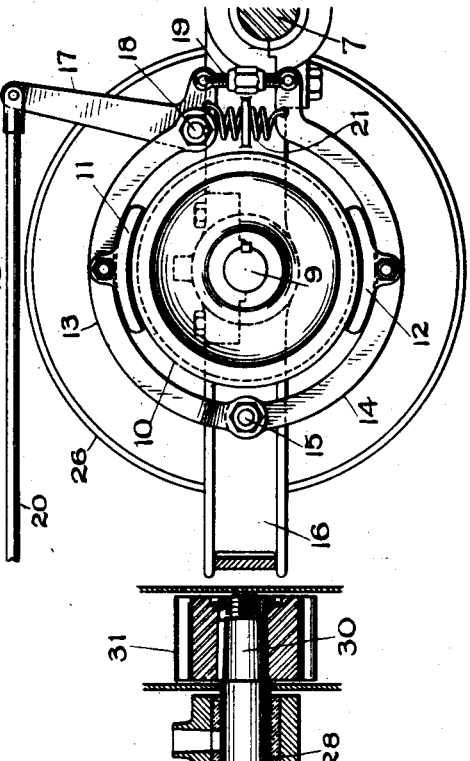
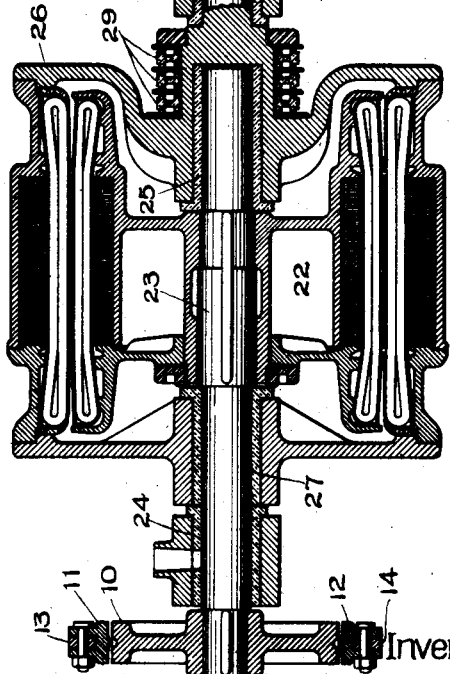
Witnesses:
Lewis T. Abell.
Benjamin B. Hull.
Inventor:
William B. Potter,
by Albert G. Davis
Atty.

UNITED STATES PATENT OFFICE.

WILLIAM B. POTTER, OF SCHENECTADY, NEW YORK, ASSIGNOR TO GENERAL ELECTRIC COMPANY, A CORPORATION OF NEW YORK.

SYSTEM OF MOTOR CONTROL.

SPECIFICATION forming part of Letters Patent No. 712,589, dated November 4, 1902.

Application filed November 1, 1900. Serial No. 35,091. (No model.)

*To all whom it may concern:*

Be it known that I, WILLIAM B. POTTER, a citizen of the United States, residing at Schenectady, county of Schenectady, State of New York, have invented certain new and useful Improvements in Systems of Motor Control, (Case No. 1,046,) of which the following is a specification.

My present invention relates to a means for controlling electric motors, which although not limited thereto is, however, of particular value in connection with the propulsion of trains. In accordance with my invention the motors which I employ are of the type having two relatively rotatable members, one of which is geared to the axle or wheels of the car upon which it is mounted, the other being acted upon by a friction-brake or other retarding device which restrains it from rotation to the extent desired. If current be admitted to such a motor and the friction-brake be off, the last-mentioned member of the motor will revolve backward without doing any work. If, however, the brake be applied, the motion of this member is restrained until it is ultimately brought to rest. The reaction between the two members of the motor is by this means transmitted to the wheels of the vehicle, thereby setting the vehicle in motion with an acceleration dependent upon the force or abruptness with which the brake is applied.

Where a number of motors are to be controlled—as, for example, in a train-control system—I have devised means whereby the brakes for all of the motors may be controlled from a single point. I have also devised means whereby the admission of current to the motors, as well as their direction of rotation, may also be controlled from a single point. These and other features of my invention will be better understood by reference to the following detailed description, taken in connection with the accompanying drawings.

The points of novelty in this system of control will be set forth with particularity in the claims appended hereto.

In the drawings, Figure 1 represents a two-car train in diagram, the brake-controlling mechanism being particularly shown. Fig. 2 is a plan view of braking mechanism, indicated in side elevation in Fig. 1. Fig. 3 is a section of a pressure-equalizing valve useful in connection with the pneumatic braking system shown in Figs. 1 and 2. Fig. 4 is a diagram of the two-car train, showing the electric circuits of the same suitable for use in case multiphase induction or synchronous motors are employed for motive power. Figs. 5 and 6 are detail views of one of the motors and its braking mechanism.

In Fig. 1 I have represented the application of a pneumatic braking system in connection with motors of that type already described, in which the two members of each motor revolve continuously relatively to each other and at practically full speed, one of the members being geared to the wheels of the vehicle and the other adapted to be acted upon by a friction-brake or other restraining device. The two cars of a train are indicated at 1 and 2, each of these cars being provided with a four-motor equipment consisting, in the case of car 1, of the motors 3 4 5 6, shown more plainly, perhaps, in a plan view in Fig. 2. One member of each motor is geared by a reducing-gear to the axle upon which it is mounted. Thus, for example, one of the members of the motor 3 is geared to the axle 7 by a spur-gearing inclosed in the gear-casing 8. In a similar manner the other motors 4, 5, and 6 are geared to the respective axles upon which they are mounted, the gearing being of common type, and therefore requiring no further detailed description. The other member of each of the motors differs, however, from the motors ordinarily in use for driving cars in that instead of being fixed it is capable of rotation. In the case of the motor 3 the shaft 9 is connected to this rotating member of the motor and is provided upon its outer end with a brake-cylinder 10. (Indicated in detail in Figs. 5 and 6.) Upon this brake-cylinder bear the shoes 11 and 12 of a friction-brake mechanism actuated pneumatically through the agency of brake-applying levers. (Shown in detail in Figs. 1, 2.)

The brake-shoes 11 and 12 are preferably pivotally mounted upon a brake-yoke consisting of two members 13 and 14, pivoted upon a pin 15, strongly fastened to a supporting-yoke 16, by which the motor is carried on the axle 7. The two members 13 and 14 of the brake-yoke are adapted to be urged together, so as to bring the brake-shoes upon the braking cylinder 10, this result being accomplished by means of a bell-crank lever 17, fulcrumed at 18 to one of the members 13 and connected to the other member 14 by an adjustable link connection 19. A rod 20 extends to the actuating device for the friction-brakes and by acting upon lever 17 to rotate it about its pivot 18 applies the brake-shoes 11 and 12 to the braking-cylinder 10. To release the brakes after the tension has been withdrawn from the actuating-rod 20, I may, if desired, use suitable springs for forcing away the brake-shoes—as, for example, the coil-springs arranged as shown at 21 in Fig. 6.

The motors which I may employ in my control system may vary widely in character, as will of course be evident. In Fig. 5 I have, however, shown one type of motor which I consider desirable. This motor is a three-phase alternating-current induction-motor, the induced member of which is indicated at 22, this induced member being mounted upon a shaft 23, having one of its bearings supported in a journal 24, formed in a supporting-yoke 16, the other end of the shaft 23 having a bearing formed, as shown at 25, within a revolving portion of the inducing member 26 of the motor. This inducing member has one of its bearings sleeved upon the shaft 23, as shown at 27, the other bearing being carried by the frame 16, as shown at 28. Collector-rings 29 serve to convey current to the inducing member 26 of the motor. The inducing member is in this case shown as having the projecting end 30 of its shaft carrying the pinion 31, which gears with a coöperating gear upon the car-axle, these gears being contained within the gear-casing, (indicated at 8 in Fig. 2.)

I have thus described with particularity the parts of one of the motors intended to be used in a system of motor control built in accordance with my invention. It is to be understood that the other motors for driving the train are similarly constructed, so that no further description of the same is necessary.

Each motor being provided with a friction-brake, some suitable means is required whereby all of the brakes may be applied simultaneously or released simultaneously. This purpose I effect by the use of a pneumatic braking system, which is or may be similar to the pneumatic braking systems in common use for braking trains. Fig. 1 illustrates such a system. At 32 is represented a suitable air-compressor of any desired type, which operates to store air in compressed form in the cylinder or reservoir 33. From this reservoir the air is conveyed to engineer's valves 34 and 35, located at either end of the car. From each of these valves piping leads to and is connected with a train-pipe 36, which extends the whole length of the train, the pipe 36 in the car 1 being connected to its extension in the car 2 by the flexible coupling 37, of usual form. From the train-pipe 36 a pipe 38 leads to each of the pneumatic braking mechanisms 39. The cylinder of the braking mechanism is indicated at 40 and has pivoted thereto a system of brake-levers 41, acting upon one set of motors. The piston-rod 42 is connected to another set of levers acting upon the other set of motors and is operatively connected to the system of levers 41 by a link 80, which is acted upon by lever 43, connected to the piston-rod. The member 42 of the pneumatic braking device is also connected by lever 43 and link 44 to an equalizing-bar 45, to one end of which is connected the rod 20, actuating the friction-brake on motor 3, while to its other end is connected a rod 46, actuating the friction-brake on the motor 4. This equalizing member 45 serves to equalize the pull upon the two rods 20 and 46, thereby causing an equal or substantially equal division of work between the two motors 3 and 4. The system of levers indicated generally at 41 is substantially the same as the system already described in connection with the motors 3 and 4, the only difference being that the fixed cylinder 40 instead of the piston-rod 42 is in this case connected to the lever 47 and acts as a sort of fulcrum, the lever 47 being acted upon through the link 80.

In operating the train system represented in Fig. 1 one only of the engineer's valves is employed—as, for example, the valve 34 at the head end of the train—the other valves being turned to their off position. For applying the brakes the valve is turned so that air is admitted from the reservoir 33 to the train-pipe 36, from which it is distributed to the various brake-cylinders 39 of the train. In order that these brake-cylinders shall operate as nearly simultaneously as possible, I provide a pressure-regulating valve between each cylinder and the train-pipe 36, these valves being represented in Fig. 1 at 48 and 49 and in detail in Fig. 3. Referring to Fig. 3, the inlet-pipe is represented at 50 and the pipe leading to the brake-cylinder at 51. Inside of the valve-casing 52, to which these pipes are connected, is located a valve 53, normally pressed against its seat by an adjustable spring 54. Within this valve 53 is a second valve 55, which in one position permits the passage of air through the valve 53 itself and in the other position prevents the passage of air. The spring 54 is adjusted so that air is not allowed to flow from the pipe 50 to the pipe 51 until a pressure has been reached sufficient to overcome the pressure of the spring 54. This allows a certain time interval after the engineer's valve has been opened during which the pressure throughout the train-pipe may become substantially equal, thereby causing the brakes to be applied at approximately the same moment. To throw off the brakes, the engineer's valve is manipulated so as to shut off the supply of air from the reservoir 33 and to allow the air in the train-pipe 36 to escape.

The unrestrained auxiliary valve 55 is intended to allow this escape of air to take place rapidly in order that the brakes may be disengaged with corresponding rapidity. As soon as the pressure in the train-pipe is lowered by the manipulation of the engineer's valve the back pressure acts upon the valve 55, opening the same, and thereby obtaining a free passage through the ports 56 into the pipe 50 and from thence to the train-pipe and into the open air.

The electric circuits for the motors on the train are indicated in Fig. 4, these circuits corresponding to those required when three-phase motors are employed. Current is transmitted through the rails 57 and the two insulated contact-rails 58 and 59, this current being derived in any ordinary manner from a suitable source of supply. The car-wheels receive current from the rails, as indicated, for example, at 60, while current from the two remaining branches or mains of the three-phase circuit is collected by means of suitable contact-shoes, (indicated, for example, at 61 and 62.) These contact-shoes are connected to conductors which extend to reversing-switches located at either end of each car, the coöperating members of the reversing-switches being connected to two train-conductors 63 64, which extend the whole length of the train.

In normal operation one terminal of each motor is connected, as shown, for example, at 60, through the framework and wheels of the truck to the rails 57. The other two terminals of each motor are permanently connected to the two train-wires 63 64, the connections being so made as to cause all of the motors to act to propel the car in the same direction when current is supplied to the motors. The direction in which current is supplied to the several windings of the motors is determined by the position of the reversing-switches connected between the contact-shoes and the train-wires. In order to insure that the direction of rotation of all of the motors shall be the same, only one reversing-switch is under the control of the motorman—as, for example, the switch at the head end of the train—the other reversing-switches being placed in open-circuit position, as indicated, for example, at 65, 66, and 67. The reversing-switch 68 at the head end of the train serves to connect the contact-shoes 61 and 62 to the train-conductors 63 and 64. In starting the train this reversing-switch is thrown in the direction corresponding to that which the train is to take. This causes the motors on the train to start up and run, the pneumatic brakes at this time being in their off position. To start the train, it is only necessary that the pneumatic brakes should be applied, so as to restrain the rotation of the freely-revolving member of each of the motors. Different gradations of speed may be obtained by suitably controlling the engineer's valve, so as to obtain varying degrees of pressure in the train-pipe, thereby permitting various degrees of slip of the pneumatic brakes. Full speed is obtained by applying maximum pressure, so as to lock the otherwise freely-revolving members of the motors in fixed position.

To obtain the beneficial effect of all of the collecting-shoes 61 62 69 70, &c., the conductors of the cars to which these contact-shoes are connected may be electrically joined together, if desired, by the connectors extending between the cars and indicated in Fig. 4 by the dotted lines 71.

In the above description I have made no reference to the means which may be employed for braking the train and so bringing it to rest, since it will be evident that any desired braking mechanism may be used, either electrical, pneumatic, or otherwise. If pneumatic train-brakes be used, it is obvious that the same source of fluid-pressure may supply both the train-brakes and the brakes for the motors.

What I claim as new, and desire to secure by Letters Patent of the United States, is—

1. An electrically-propelled train, each motor unit of which consists of a car having mounted thereon a motor having two rotatable members, one of which is geared to an axle of the car, and means controllable from a single point on the train for restraining rotation of the other member of the motor.

2. An electrically-propelled train each motor unit of which consists of a car having mounted thereon a motor having two rotatable members, one of which is geared to an axle of the car, and pneumatic means controllable from a single point on the train for restraining rotation of the other member of the motor.

3. An electrically-propelled train, each motor unit of which consists of a car having mounted thereon a motor having two rotatable members, one of which is geared to an axle of the car, and a fluid-pressure brake for restraining rotation of the other member of the motor.

4. An electrically-propelled train consisting of a plurality of motor-cars, means for supplying alternating current to motors on cars, means controllable from a single point on the train for reversing the direction of rotation of all the motors, and independent means for starting and stopping the train.

5. The combination of a motor both members of which are rotatable, fluid-pressure-actuated means for restraining the rotation of one of the members, and means located at a distance from the motor for controlling said fluid-pressure.

6. The combination of an induction-motor both members of which are rotatable, and pneumatically-actuated means for restraining the rotation of one of the members.

7. The combination of a car, a motor having one member geared to an axle of the car, the other member of the motor being capable of rotation, and pneumatically-controlled means for restraining the rotation of the last-mentioned member.

8. The combination of a train of cars, an induction-motor geared to wheels of each motor-car, each motor being constructed so that both of its members are capable of rotation, and means for controlling all the motors from a single point.

9. In a train-control system, the combination of a plurality of cars, each having mounted thereon a motor with two rotatable members, one of which is geared to an axle or wheel of the car, a torque-resisting device operatively related to the other member of the motor, means for simultaneously reversing the motor, and means for simultaneously applying or letting off the torque-resisting devices.

10. In a train-control system, the combination of a plurality of cars, each having mounted thereon a motor with two rotatable members, one of which is geared to an axle or wheel of the car, a torque-resisting device operatively related to the other member of the motor and means for simultaneously reversing the motors.

11. The combination of a plurality of motors, friction-brakes acting upon one member of each motor respectively, and means for simultaneously applying all the brakes.

12. The combination of a vehicle, a motor having two movable members one of which is geared to a wheel of said vehicle, and means controllable from a plurality of points on said vehicle for restraining rotation of the other member of said motor.

In witness whereof I have hereunto set my hand this 30th day of October, 1900.

WILLIAM B. POTTER.

Witnesses:
BENJAMIN B. HULL,
MARGARET E. WOOLLEY.